United States Patent
Keshavaraj

(10) Patent No.: US 7,144,038 B2
(45) Date of Patent: Dec. 5, 2006

(54) SIDE PROTECTION AIRBAGS AND METHOD OF MAKING SIDE PROTECTION AIRBAGS

(75) Inventor: Ramesh Keshavaraj, Peachtree City, GA (US)

(73) Assignee: Milliken & Company, Spartanburg, SC (US)

( * ) Notice: Subject to any disclaimer, the term of this patent is extended or adjusted under 35 U.S.C. 154(b) by 26 days.

(21) Appl. No.: 10/630,403

(22) Filed: Jul. 30, 2003

(65) Prior Publication Data

US 2005/0023812 A1    Feb. 3, 2005

(51) Int. Cl.
*B60R 21/16* (2006.01)

(52) U.S. Cl. .................. 280/743.1; 280/730.2

(58) Field of Classification Search ............. 280/743.1, 280/730.2, 739; 428/35.2, 35.5, 36.1
See application file for complete search history.

(56) References Cited

U.S. PATENT DOCUMENTS

| | | | |
|---|---|---|---|
| 6,386,578 B1 | 5/2002 | Nanbu et al. | |
| 6,666,475 B1 * | 12/2003 | Kippschull | 280/730.2 |
| 6,805,374 B1 * | 10/2004 | Saderholm et al. | 280/730.2 |
| 2002/0027353 A1 | 3/2002 | Keshavaraj | |
| 2002/0105173 A1 | 8/2002 | Saderholm et al. | |
| 2002/0146949 A1 | 10/2002 | Keshavaraj | |
| 2002/0167153 A1 | 11/2002 | Kippschull | |

FOREIGN PATENT DOCUMENTS

| | | |
|---|---|---|
| JP | 09-048306 A | 2/1997 |
| WO | WO 02/16174 A1 | 2/2002 |

* cited by examiner

*Primary Examiner*—Faye M. Fleming
(74) *Attorney, Agent, or Firm*—Terry T. Moyer; Robert M. Lanning

(57) ABSTRACT

An inflatable side protection airbag having a first panel and a second panel, in which the first panel and second panel each have an anterior portion and a posterior portion. The first panel may comprise the outboard portion of the inflated structure. The second panel may be formed in separate fabric pieces which are sewn together, reducing the overall amount of fabric required to construct the second panel. A bridging portion may be provided in the second panel. The bridging portion may be provided adjacent a void area which is positioned at least partially between the anterior portion and the posterior portion of the second panel. An anterior portion of the first panel is mated to the anterior portion of the second panel in forming a front pillow. A posterior portion of the first panel is mated to the posterior portion of the second panel to form a back pillow. The ratio of the amount of fabric actually employed in the final product to the amount of fabric blank utilized for the construction may be as much as eighty or even ninety percent or greater for some designs.

19 Claims, 6 Drawing Sheets

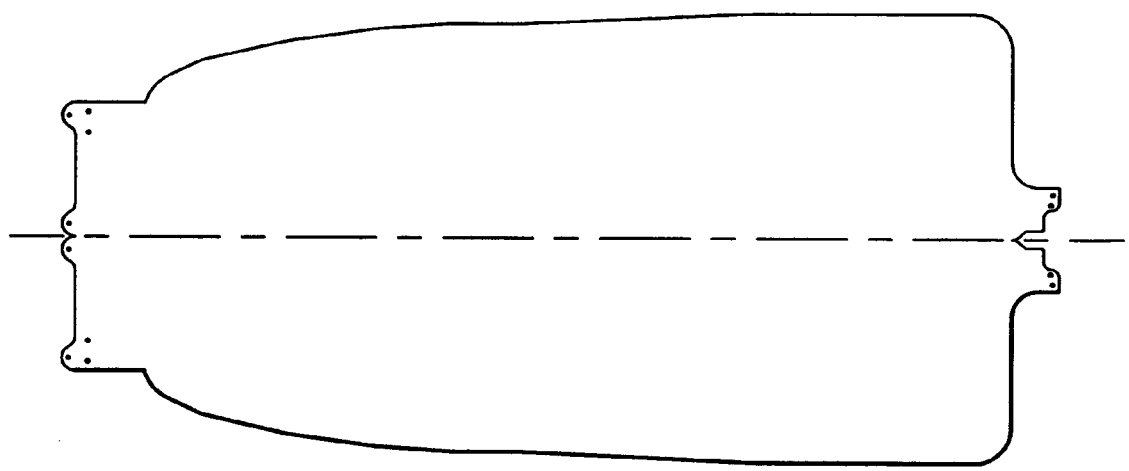
Figure -1-
PRIOR ART
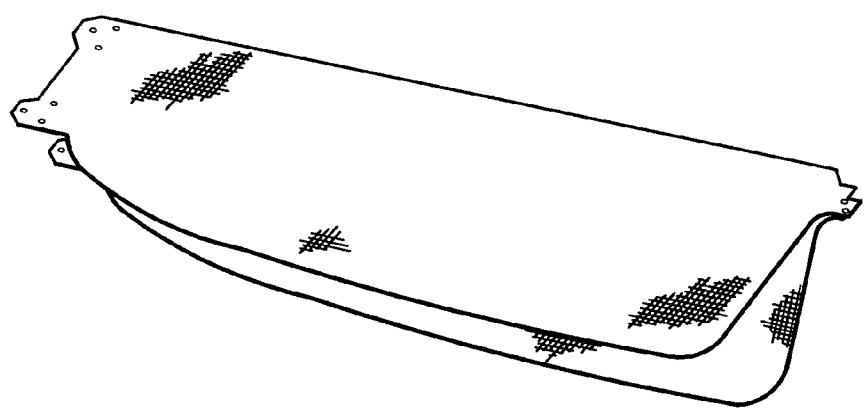
Figure -1A-
PRIOR ART

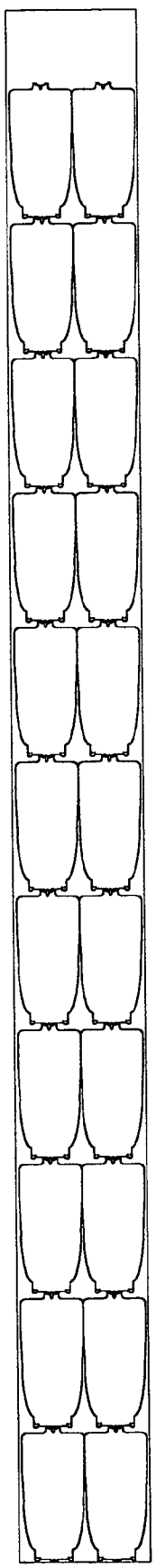
*Figure -1B-*
PRIOR ART
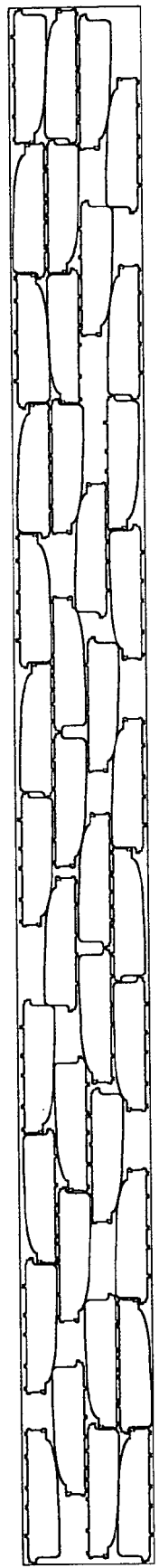
*Figure -1C-*
PRIOR ART

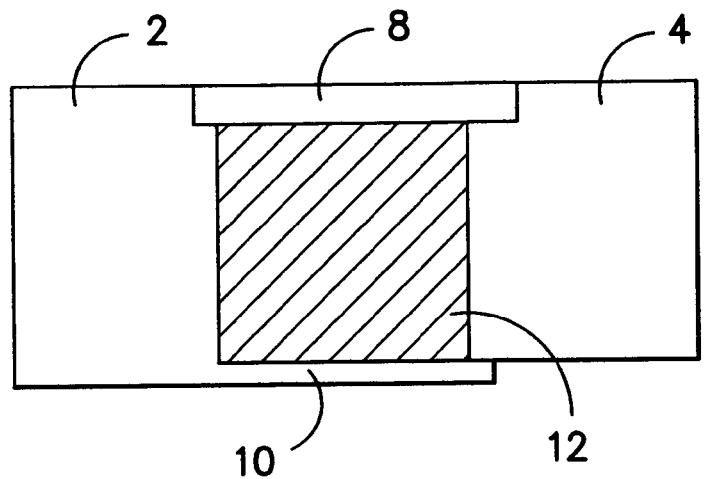
Figure −1D−
PRIOR ART
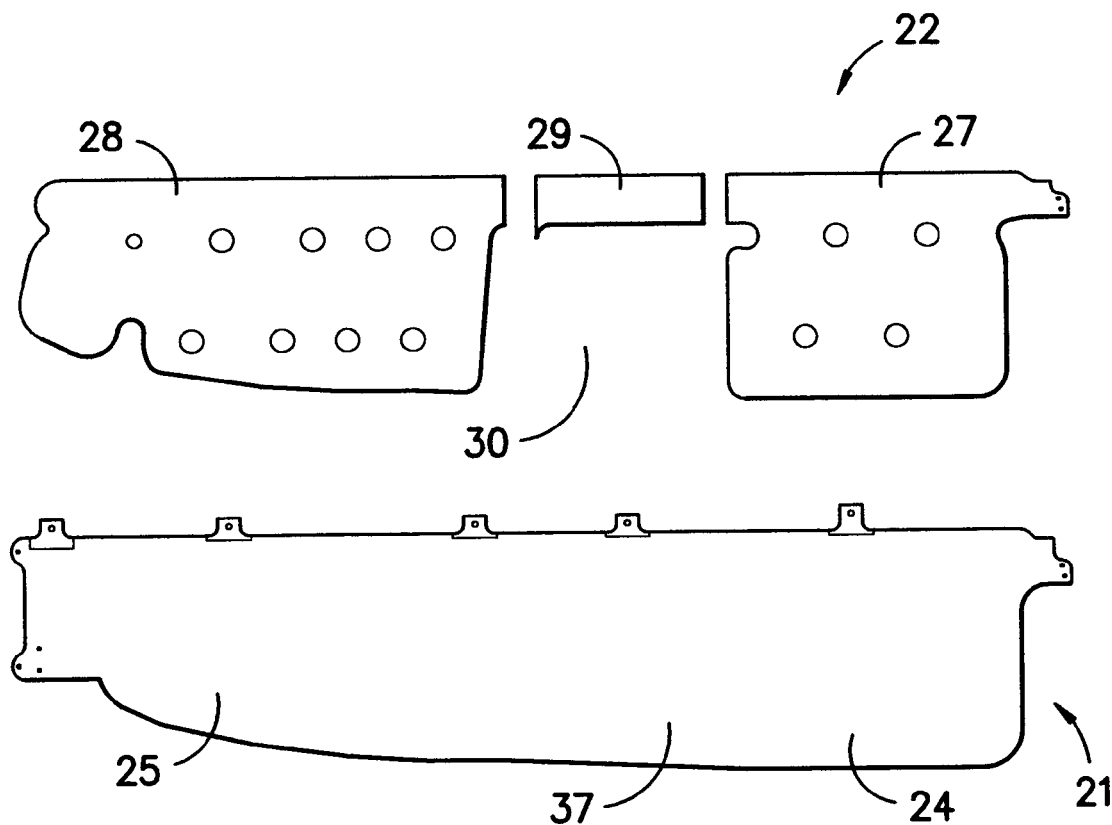
Figure −2−

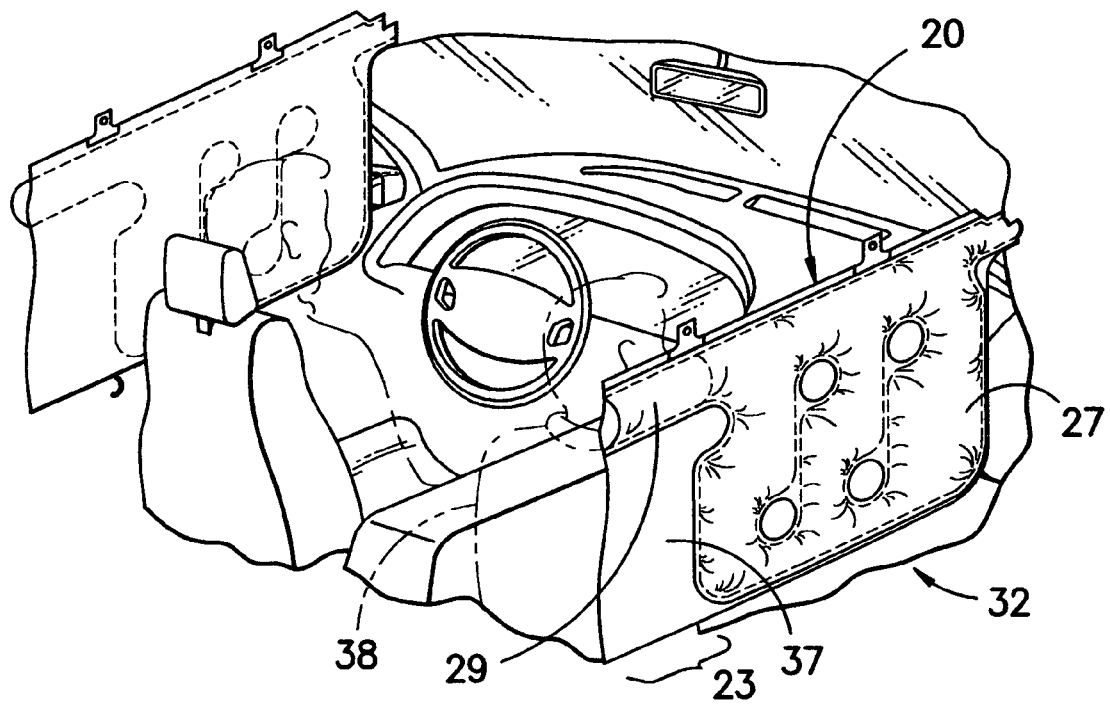
*Figure -2A-*
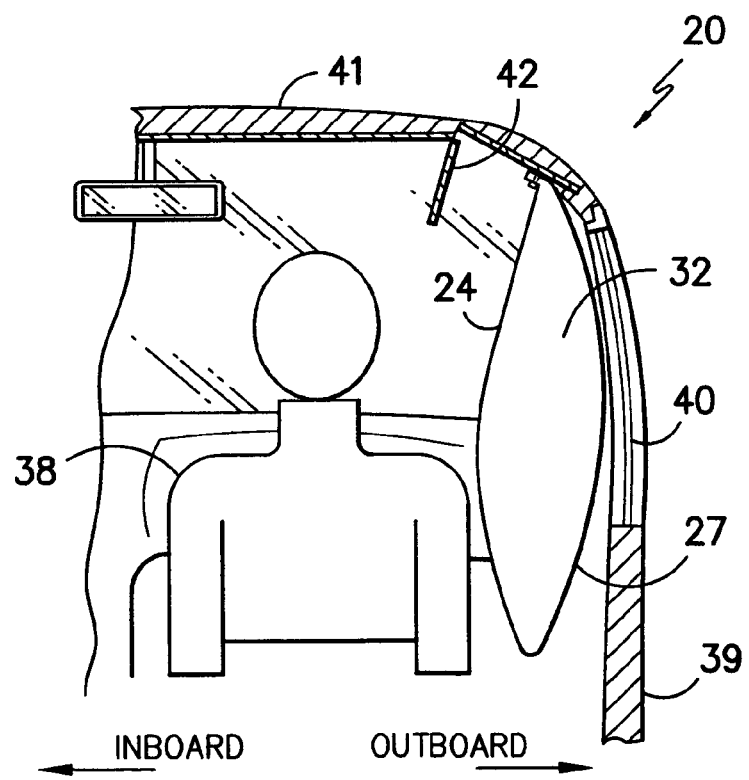
*Figure -2B-*

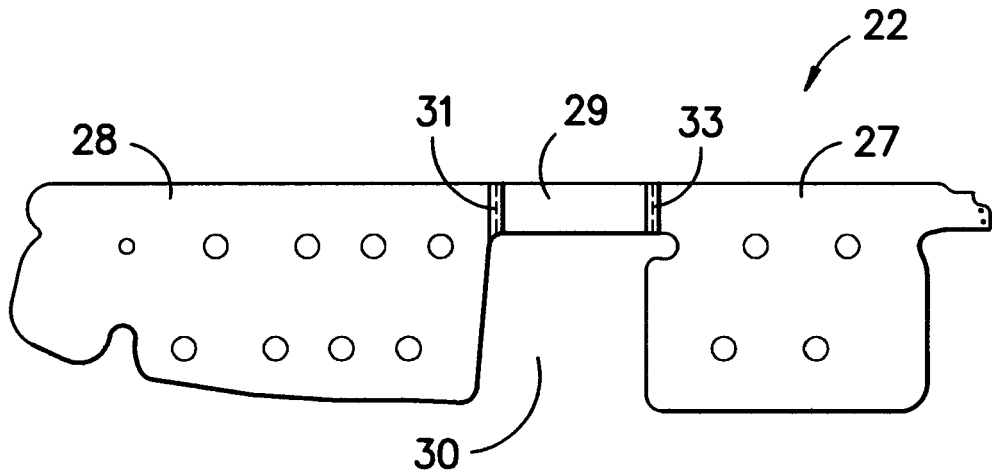
Figure -3-
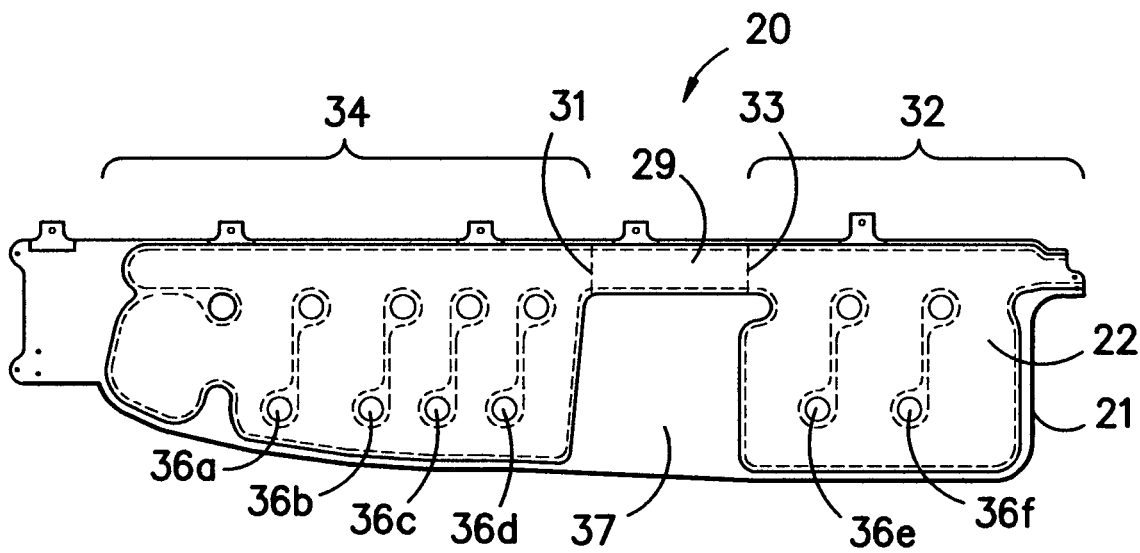
Figure -4-

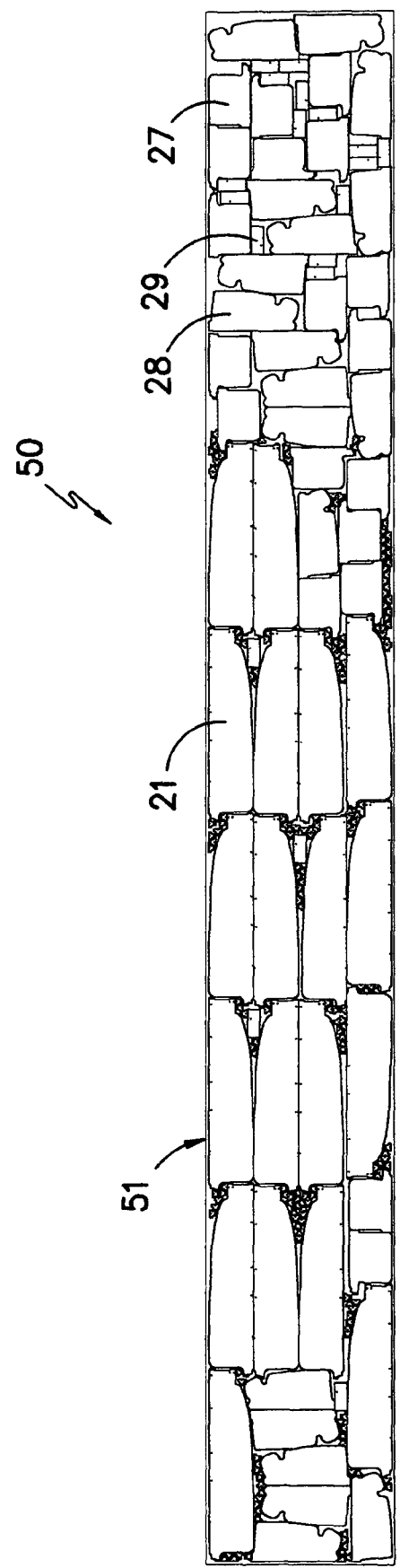
Figure -5-

US 7,144,038 B2

SIDE PROTECTION AIRBAGS AND METHOD OF MAKING SIDE PROTECTION AIRBAGS

BACKGROUND OF THE INVENTION

Side protection airbags are used in various modern automobiles. Side protection airbags may be capable of a single and brief deployment which cushions the passenger against a single impact upon the interior of an automobile. Other side protection airbags may be engineered to remain inflated for a relatively longer period of time to protect a passenger against multiple and repetitive impacts within the automobile, as in the case of a vehicle rollover in which the vehicle rolls multiple times following impact.

The manufacture of airbags is labor intensive. Furthermore, the fabric from which airbags are made is costly. It is a goal among airbag designers to minimize wasted fabric which remains following cutting and sewing of an airbag. An airbag design which reduces the number of steps required to assemble or sew a bag, or which reduces waste fabric, or both, is desirable.

Side protection airbags must extend a relatively long distance when deployed along each side window. Many such airbags deploy downward from a storage point located along the upper region of side windows. Typically, such side impact airbags extend from a point near the front windshield to a point near the back windshield of an automobile, along each side. However, there usually is no need for inflatable airbag protection in the area which is directly opposite the seats of the car (i.e. adjacent the door post between front and back doors, for example). It is desirable to make airbags which do not include inflatable portions adjacent the window posts of the automobile.

It is important that airbags, when deployed, exhibit tension along their lower edge. Such tension assists in retaining passengers within the automobile following deployment of the airbag during a crash or rollover event. Furthermore, it is advantageous that front and rear inflatable portions of an airbag be connected near the lower margin of such airbags to provide such tension.

Airbags are cut from relatively long pieces of fabric, sometimes called fabric blanks. The pattern or template employed in such cuttings determines the amount of fabric waste generated during manufacture.

FIG. 1 shows a typical prior art airbag design in which both sides of the inflatable structure are cut as a one-piece unit. The one-piece cutting is folded as shown in FIG. 1A and then sewn to form an inflatable airbag. Relatively large amounts of fabric waste are generated using such a design. FIG. 1B shows one manner in which the airbag configuration of FIG. 1 may be provided in a layout on a fabric blank for cutting.

FIG. 1C shows yet another conventional nesting pattern which results in a fabric usage efficiency of about 75%. By efficiency, it is meant the ratio of the amount of fabric from a fabric blank actually used in the finished airbag product as compared to the total amount of the fabric blank or blanks utilized in the construction of the airbag, in square units. In this particular nesting pattern, both sides (i.e. inboard and outboard) are cut separately as separate fabric pieces. Each side (i.e. inboard and outboard) is cut as one piece, as shown in the FIG. 1C, and may use for example using a material width of fabric blank of about 177.80 centimeters. After cutting, the two pieces may be sewn together to form an inflatable airbag structure.

United States Patent Application Publication US 2002/0167153 A1 to Kippschull (published Nov. 14, 2002; hereafter the "Kippschull publication") discloses a side curtain airbag having at least two inflation chambers spaced apart from each other. The inflation chambers each have two fabric layers. The region between the two inflation chambers has at most one layer of fabric, in one embodiment. FIG. 1D of the Kippschull specification (which also corresponds to FIG. 1D herein) shows a Kippschull prior art design which uses one piece of fabric positioned between respective inflation chambers. See paragraph 19, Kippschull publication, and FIG. 1D.

In the Kippschull device shown in FIG. 1D, inflation chambers 2,4 are shown. The fabric layer 12 is one piece, or continuous, with only one of the fabric layers of an inflation chamber, not with both chambers. Paragraph 19, line 8, Kippschull publication. The inflation chambers 2 and 4, the cover 8, and the connecting strip 10 also may be manufactured as a separate piece of fabric. Kippschull publication, paragraph 19, line 18.

It is desirable that side protection airbags be economical to manufacture, and yet provide appropriate tension and continuity along their length, thereby providing adequate protection against passenger injury when deployed in an automobile.

BRIEF DESCRIPTION OF THE DRAWINGS

The following Figures illustrate applicable prior art, and also the various embodiments of the invention. FIGS. 1, 1A, 1B, 1C, and 1D illustrate prior art. FIGS. 2–5 illustrate the invention(s).

FIG. 1 illustrates one form of a prior art airbag which is cut so that inboard and outboard portions are formed in the cutting as one piece of fabric;

FIG. 1A shows the manner in which the prior art airbag of FIG. 1 is folded during manufacture to form a structure that may be sealed and inflated;

FIG. 1B illustrates a manner of nesting or layout of the prior art airbag of FIG. 1 upon a fabric blank during cutting;

FIG. 1C illustrates one manner of nesting yet another prior art airbag having separate inboard and outboard portions, thereby generating significant amounts of fabric waste in the manufacturing process;

FIG. 1D shows a prior art airbag design disclosed in US 2002/0167153 A1 to Kippschull et al;

FIG. 2 shows a first embodiment of the invention, in which a unitary first panel is shown near the bottom of the Figure and a non-unitary second panel is shown near the top of the Figure;

FIG. 2A illustrates the anterior portion of the side protection airbag of FIG. 2 after assembly, as when deployed in an automobile;

FIG. 2B illustrates a cross-sectional view of the airbag of FIG. 2A as deployed in an automobile, showing the first panel and the second panel in relation to the side of the vehicle and the passenger when viewed from the rear of the automobile;

FIG. 3 reveals the connection points for the separate cut portions of the second panel which when combined form an integrated panel structure;

FIG. 4 illustrates a view of the airbag after mating of the first and second panels, in which the airbag from FIG. 2, after mating, includes a first panel and a second panel attached in a manner to accommodate inflation of the airbag; and FIG. 5 illustrates a nesting pattern or layout that may be employed in cutting fabric to construct panels for the airbag according to the invention.

SUMMARY OF THE INVENTION

In the invention, a first embodiment provides a side inflation airbag including a first panel having an anterior portion and a posterior portion, in which both anterior and posterior portions of the first panel are formed from a single piece of fabric. This may be referred to herein as a "unitary panel", since the entire panel is cut as a single piece of fabric. A linking portion is a region between the anterior and posterior portions of the first panel, and the linking portion serves to connect front seat and rear seat airbag pillows when the airbag is deployed, as further discussed herein.

Furthermore, a second panel is provided having an anterior portion, a posterior portion, and a bridging portion, in which the anterior and posterior portions are connected to one another by the bridging portion. This second panel may be referred to herein as a "non-unitary" portion or panel, indicating that the anterior portion and the posterior portions of the second panel are not comprised of only one piece of fabric, but instead, such portions are comprised of at least two separate cut pieces of fabric. A bridging portion may be provided adjacent to a void area, and the bridging portion may be cut integrally with the anterior or posterior portions of the second panel, or alternately may be formed from yet another piece of cut fabric. The void area typically is positioned between the anterior portion and the posterior portion of the second panel.

A second embodiment of the invention would provide a first panel comprised of multiple pieces of fabric, in which said multiple pieces are sewn together and then mated with a second panel.

The anterior portion of the first panel is mated to the anterior portion of the second panel in forming a two-layered front pillow. The posterior portion of the first panel is mated to the posterior portion of the second panel to form a two-layered back pillow. When so mated, a linking portion of the first panel (including a single fabric layer) "covers" or corresponds in mating configuration to the void area of the second panel, and connects the front and back pillows to each other.

A method of forming fabric panels for mating attachment to each other in forming an inflatable airbag is disclosed as well.

DETAILED DESCRIPTION OF THE INVENTION

Reference now will be made to the embodiments of the invention, one or more examples of which are set forth below. Each example is provided by way of explanation of the invention, not as a limitation of the invention.

Turning now to the Figures illustrating the invention, FIG. 2 illustrates the two primary portions of the inflatable side protection airbag 20. That is, the first panel 21 is shown near the bottom of FIG. 2, and the separate second panel 22 is shown near the top of the FIG. 2. The first panel 21 includes an anterior portion 24 and a posterior portion 25, separated by a linking portion 37. In this embodiment, the first panel 21 is a single cut piece of fabric. However, other embodiments of the invention may employ more than one cut pieces of fabric, which are joined together in forming the first panel (this latter embodiment is not illustrated, but is one embodiment of the invention).

The panels 21, 22 shown in FIG. 2 are cut from fabric blank 51, as will be discussed in connection with FIG. 5. The linking portion 37 comprises that portion of first panel 21 which, when the panels 21 and 22 are mated, will correspondingly mate with void area 30 of first panel 22.

FIG. 2 reveals a second panel 22 comprising an anterior portion 27, a posterior portion 28, and a bridging portion 29 positioned between such portions. These three components may be cut as three separate pieces of fabric in this particular embodiment (i.e. three separate pieces of fabric cut from blank 51, see FIG. 5). Other embodiments may use less or more than three cut portions of fabric for second panel 22.

The anterior portion 27, posterior portion 28 and bridging portion 29 may be subsequently attached together in forming an integrated second panel 22. However, in other embodiments not shown, it may be convenient to cut an anterior portion 27 or a posterior portion 28 to include as well in the cut the bridging portion (this latter embodiment is not shown), so that the entire second panel 22 may be formed from only two pieces of fabric. Thus, in this latter embodiment the bridging portion may be cut integrally with another portion.

The second panel 22 is sometimes deemed a "non-unitary" panel because of the fact that it is not cut from a single "unit" of fabric, but instead is cut in at least two pieces and then attached to form a second panel 22. A void area 30 is positioned between the anterior portion 27 and the posterior portion 28. When the airbag is deployed in an automobile, there is no need in the region of this void area to have any inflation of the airbag 20; therefore, fabric is intentionally omitted from the void area 30 to form an airbag that does not have a two layer inflatable structure in this region, but instead has only a one-layered linking portion 37, thereby reducing costs of manufacture.

FIG. 2A shows a partial cutaway perspective view of only a portion of inflatable side protection airbag 20 (also seen in FIG. 4). FIG. 2B shows a view from the rear (with the seat removed) showing passenger 38 from the rear. The front pillow 32 of the airbag 20 is shown on the right side of a vehicle, fully deployed for cushioning a passenger 38 against an impact with the interior of the automobile. A door post area 23 is positioned to correspond with the void area 30 (see FIG. 2) of the first panel 21 of an inflated airbag 20, as discussed above in connection with FIG. 2. The linking portion 37 (see FIGS. 2, 2A, 4) of the first panel 21 may be seen adjacent the door post area 23 in FIG. 2A.

In the particular embodiment of the invention shown in the FIGS. 2A and 2B, the anterior portion 24 of the first unitary first panel 21 is provided on the inboard side of the vehicle, while the anterior portion 27 of the non-unitary second panel 22 is provided on the outboard side of the vehicle. It would be possible in other embodiments to provide a reverse configuration in which the unitary first panel 21 (and its anterior portion 24) was oriented near the glass 40 (outboard side) while the non-unitary second panel 22 (and its anterior portion 27) is located on the inboard side adjacent the passenger 38. Either configuration could be used in the practice of the invention, and the exact design employed may be determined by many factors.

FIG. 2B shows a deployed and inflated front pillow 32 of airbag 20. Front pillow 32 is positioned to receive the passenger 38 upon impact, cushioning the blow of the passenger 38 against the glass 40 and the automotive door 39. The airbag 20 is deployed for inflation from a position near the roof 41 (roof is removed for illustrative purposes from FIG. 2A) upon opening of the hatch 42. Front pillow 32 is comprised of the anterior portion of the first panel 21, which is mated with the anterior portion of the second panel 22.

In FIG. 3, a second panel 22 is seen fully formed, which in this case includes sewing along first seam 31 and second seam 33 of the bridging portion 29. In other embodiments, the non-unitary second panel 22 could be assembled by gluing, bonding, adhering, or otherwise attaching by any means known in the art portions of fabric to each other to form an inflatable structure. Typically, the second panel 22 is assembled to an integrated unit prior to its mating with the first panel 21 in a subsequent assembly procedure.

FIG. 4 shows the inflatable side protection airbag 20 which is assembled by the mating together of first panel 21 and second panel 22. The first panel 21 is slightly larger around the perimeter of the airbag 20 as compared to second panel 22, which facilitates stitching of the airbag 20 around its perimeter during manufacture. Front pillow 32 is inflatable, and consists of the mated union of the anterior portion 24 of the first panel 21 and the anterior portion 27 of the second panel 22 (see FIGS. 2A and 2B). The back pillow 34 is also inflatable, and is formed by the mated union of the posterior portion 28 of the second panel 22 and the posterior portion 25 of the first panel 21.

In the embodiment of FIG. 4, the first panel 21 is stitched by sewing the second panel 22 to the first panel 21 around the full perimeter of the airbag 20, and also stitched at sewn stitches 36a–f. The sewn stitches 36a–f assist in reducing the inflated volume of the airbag to a volume that may facilitate inflation in a very short time span when gas is injected into the respective front and back pillows 32, 34 by an inflator (not shown). Sewing steps may be accomplished using for example a Brother 360® sewing commercial sewing machine with the sewing accomplished in at least two steps, as discussed.

In FIG. 4, the linking portion 37 of the first panel 21 tethers or holds the front pillow 32 with respect to the back pillow 34, contributing to the integrity and tension of the airbag in its deployed condition as shown in FIG. 2B.

FIG. 5 shows a desirable nesting pattern 50 of the invention in which various components of the airbag 20 are configured for cutting from fabric blank 51 in a very efficient and cost effective manner. This efficiency is made possible in part because of the discovery in the course of the invention that a non-unitary second panel 22 may be constructed by cutting it from more than one piece of fabric, and then connecting the separate fabric pieces as previously discussed, to integrate them into a second panel 22, which, when mated to a first panel 21, is prepared for inflation.

In FIG. 5, it may be seen that posterior portion 28, anterior portion 27, and bridging portion 29 of the non-unitary second panel 22 are nested upon the fabric blank 51, along with other like portions. Further, the unitary first panel 21 also is nested in close proximity to other like portions upon the fabric blank 51. The pattern of FIG. 5 significantly reduces fabric waste in airbag construction, without compromising the utility or function of the manufactured airbag, as compared for example to the pattern seen in prior art FIG. 1B or 1C, which do not employ the advantages of the invention.

The ratio of the amount of fabric actually employed in the final airbag 20 to the amount of fabric blank 51 utilized for the construction may be as much as eighty or even ninety percent or greater for designs in accord with the invention. The nesting pattern 50 shown in FIG. 5, achieves a ratio of about 92.70 percent at a material width of 177.80 cm, as one example. Other nesting patterns may achieve about 80 percent, 85 percent, or between 80 and 95 percent, depending upon the exact layout and dimensions employed. The fact that one panel is unitary (one piece) and the other mating panel to which is to be attached is non-unitary (i.e. cut from more than one piece) provides significant and surprising efficiency in layout and design of airbags, while still ensuring structural integrity during deployment and use. The amount of waste is represented by the difference between 100 percent and the actual ratio achieved in any particular configuration.

Of course, it should be recognized that the invention also may employ a non-unitary first panel and a non-unitary second panel in another embodiment of the invention. That is, in the case of a first panel which is cut from more than one piece of fabric, and these pieces are then joined together; and a second panel which also is cut from more than one piece of fabric; wherein the first and second panels are then mated and joined to form an inflatable structure. This latter embodiment is not specifically illustrated in the Figures.

The configuration in FIG. 5 was prepared using a material width of about 177.80 centimeters, with a progress of 280/280, having a nest length of about 1579.230 cm, at about 17 yards and 9.744 inches per job. The border length was about 25,335.16 at a nest width of about 177.80 cm, resulting in an efficiency (ratio) of about 92.70 percent. A Nester Software Technologies program was employed to construct the pattern 50 shown in FIG. 5. Clearly, other layouts which differ from that shown in FIG. 5 could be employed in the practice of the invention, and the scope of the invention is not limited to any particular layout.

It is understood by one of ordinary skill in the art that the present discussion is a description of exemplary embodiments only, and is not intended as limiting the broader aspects of the present invention, which broader aspects are embodied in the exemplary constructions. The invention is shown by example in the appended claims.

What is claimed is:

1. An inflatable side protection airbag, said airbag comprising:

(a) a first panel, said first panel having an anterior portion and a posterior portion, said anterior and posterior portions being formed from a single piece of fabric, and (b) a second panel, said second panel having an anterior portion, a posterior portion, and a bridging portion, said anterior and posterior portions being connected to one another by said bridging portion, said bridging portion lying adjacent a void area, said void area being positioned at least partially between said anterior portion and said posterior portion of said second panel, said second panel being formed from more than one cut pieces of fabric;

(c) wherein said anterior portion of said first panel is mated to said anterior portion of said second panel in forming a front pillow, (d) wherein said posterior portion of said first panel is mated to said posterior portion of said second panel to form a back pillow, and (e) wherein said anterior and posterior portions of said second panel are not coextensive with said anterior and posterior portions of said first panel.

2. The airbag of claim 1 wherein said bridging portion is inflatable, said bridging portion providing for air flow between said front pillow and said back pillow.

3. The airbag of claim 1 wherein said anterior portion of said second panel comprises a first piece of fabric, said posterior portion of said second panel comprises a second piece of fabric, and said bridging portion comprises a third piece of fabric.

4. The airbag of claim 1 wherein said first panel is comprised of more than one piece of fabric.

5. The airbag of claim 1 wherein said first panel is sewn to said second panel.

6. The airbag of claim 1 wherein the first and second panels are cut from at least one fabric blank, further wherein in the construction of said airbag, the ratio of (1) the amount of said fabric blank(s) which are actually employed in the airbag product as compared to (2) the total amount of said fabric blank(s), in square units, is greater than about 80 percent.

7. The airbag of claim 6 wherein said ratio is greater than about 90 percent.

8. The airbag of claim 1 wherein there is essentially no free space between said front pillow and said back pillow.

9. An inflatable airbag comprising:
   (a) a unitary first panel, said first panel having an anterior portion, a posterior portion, and a linking portion, each of said anterior, posterior, and linking portions being formed from a single piece of fabric, said linking portion being positioned between said anterior portion and said posterior portion; and
   (b) a non-unitary second panel, said second panel having an anterior portion, a posterior portion, and a bridging portion, said anterior and posterior portions being connected to one another by said bridging portion, said bridging portion lying adjacent a void area, said void area being positioned at least partially between said anterior portion and said posterior portions of said second panel, said second panel being formed from two or more pieces of fabric;
   (c) wherein said anterior portion of said first panel is mated to said anterior portion of said second panel in forming a front pillow,
   (d) wherein said posterior portion of said unitary first panel is mated to said posterior portion of said non-unitary second panel to form a back pillow;
   (e) wherein said linking portion of said unitary first panel is positioned opposite said void area of said non-unitary second panel;
   (f) wherein the space between said front pillow and said back pillow is substantially completely filled with fabric, and substantially free of clear space, and
   (g) wherein said anterior and posterior portions of said second panel are not coextensive with said anterior and posterior portions of said first panel.

10. The airbag of claim 9 wherein said bridging portion provides continuity of air flow between said front pillow and said back pillow.

11. The airbag of claim 9 wherein said anterior portion of said second panel comprises a first piece of fabric, said posterior portion of said second panel comprises a second piece of fabric, and said bridging portion comprises a third piece of fabric.

12. The airbag of claim 9 wherein during the construction of said airbag there is essentially no fabric waste which corresponds to said void area of said non-unitary second panel.

13. The airbag of claim 9 wherein said first panel is sewn to said second panel.

14. The airbag of claim 9 wherein the first and second panels are cut from at least one fabric blank, further wherein in the construction of said airbag, the ratio of (1) the amount of said fabric blank(s) which are actually employed in the airbag product as compared to (2) the total amount of said fabric blank(s) employed for said construction, in square units, is greater than about 80 percent.

15. The airbag of claim 14 wherein said ratio is greater than about 90 percent.

16. The airbag of claim 9 wherein said non-unitary second panel is formed from at least three portions of cut fabric.

17. The airbag of claim 9 wherein said anterior portion of said unitary panel is adjacent said linking portion of said unitary panel, and said linking portion of said unitary panel lies adjacent said posterior portion of said unitary panel.

18. The airbag of claim 9 wherein said unitary first panel comprises an inboard panel.

19. The airbag of claim 16 wherein said non-unitary second panel comprises an outboard panel.

\* \* \* \* \*